(12) United States Patent
Keller et al.

(10) Patent No.: US 8,265,015 B2
(45) Date of Patent: Sep. 11, 2012

(54) COMMUNICATION PATH ALLOCATING ENTITY AND METHOD

(75) Inventors: Ralf Keller, Würselen (DE); Andreas Witzel, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 658 days.

(21) Appl. No.: 11/916,789

(22) PCT Filed: Jun. 7, 2005

(86) PCT No.: PCT/EP2005/006100
§ 371 (c)(1),
(2), (4) Date: Dec. 6, 2007

(87) PCT Pub. No.: WO2006/131130
PCT Pub. Date: Dec. 14, 2006

(65) Prior Publication Data
US 2008/0198764 A1 Aug. 21, 2008

(51) Int. Cl.
*H04W 4/00* (2009.01)
(52) U.S. Cl. ......... 370/329; 370/331; 370/474; 455/436
(58) Field of Classification Search .................. 370/230, 370/252, 331, 329, 474, 468; 709/224–229; 455/67.13, 452.2
See application file for complete search history.

(56) References Cited

U.S. PATENT DOCUMENTS

| | | | |
|---|---|---|---|
| 5,542,097 A * | 7/1996 | Ward et al. ................. 455/437 |
| 6,393,008 B1 | 5/2002 | Cheng et al. |
| 6,968,192 B2 * | 11/2005 | Longoni ....................... 455/453 |
| 7,480,239 B1 * | 1/2009 | Sundaresan et al. ......... 370/230 |
| 7,570,590 B2 * | 8/2009 | Lauer .......................... 370/235 |
| 8,068,476 B2 * | 11/2011 | Jang et al. ................... 370/347 |
| 2001/0012271 A1 * | 8/2001 | Berger ......................... 370/230 |
| 2003/0031208 A1 * | 2/2003 | Anehem et al. .............. 370/474 |
| 2003/0117978 A1 * | 6/2003 | Haddad ........................ 370/331 |
| 2003/0212787 A1 * | 11/2003 | Qiu et al. ..................... 709/224 |
| 2004/0057400 A1 * | 3/2004 | Walsh et al. ................. 370/329 |
| 2004/0085909 A1 * | 5/2004 | Soliman ....................... 370/252 |
| 2004/0151186 A1 * | 8/2004 | Akama ...................... 370/395.3 |
| 2004/0170191 A1 * | 9/2004 | Guo et al. .................... 370/468 |
| 2004/0196808 A1 * | 10/2004 | Chaskar et al. .............. 370/331 |
| 2004/0198234 A1 * | 10/2004 | Wacker et al. ............. 455/67.13 |

(Continued)

FOREIGN PATENT DOCUMENTS

EP 1 317 108 A1 6/2003

(Continued)

OTHER PUBLICATIONS

Miyamura, T. et al. A study on Load Balancing Method with Explicit Routing in MPLS Networks Technical Report of IEICE, SSE200-54 (200-06), Jun. 23, 2000. vol. 100, No. 154, pp. 25-30.

*Primary Examiner* — Ayaz Sheikh
*Assistant Examiner* — Mounir Moutaouakil

(57) ABSTRACT

A communication path allocating entity and method are described. The entity (10) comprises a receiver (11) for receiving session requests for requesting one or both of an establishment of a new communication session and a change in existing communication session between a network and one or more terminals (20), and a processor (12) for processing the session requests and for allocating one or more communication paths (21, 23, 25) to each of the communication sessions. A session database (28) is provided for keeping record of the allocated communication path and their associated sessions.

24 Claims, 5 Drawing Sheets

U.S. PATENT DOCUMENTS

| | | | |
|---|---|---|---|
| 2004/0203831 A1* | 10/2004 | Khan | 455/452.2 |
| 2004/0215766 A1 | 10/2004 | Haddad | |
| 2005/0068965 A1 | 3/2005 | Lin et al. | |
| 2005/0220039 A1* | 10/2005 | Hoshino et al. | 370/261 |
| 2010/0260134 A1* | 10/2010 | Heath et al. | 370/329 |

FOREIGN PATENT DOCUMENTS

| | | |
|---|---|---|
| EP | 1 370 103 A | 12/2003 |
| JP | 2004-274142 | 9/2004 |
| WO | WO0013447 A1 * | 3/2000 |
| WO | WO 00/67604 A1 | 9/2000 |
| WO | WO 03/088599 A1 | 10/2003 |
| WO | WO 2004/008693 A1 | 1/2004 |
| WO | WO 2004/107106 | 12/2004 |

\* cited by examiner

COMMUNICATION PATH ALLOCATING ENTITY AND METHOD

FIELD OF THE INVENTION

The present invention relates to a communication path allocating entity and method for allocating communication paths in communication sessions between a network and a plurality of terminals. Each of the terminals is connectible to the network via at least one of the communication paths.

BACKGROUND OF THE INVENTION

In communication systems, especially in mobile communication systems, it is possible that a given terminal can connect to a network via a plurality of communication paths. Such communications paths can e.g. be provided by a sub-network or access network that provides a plurality of bearers, or by a plurality of sub-networks or access networks through which a terminal is capable of communicating to the network.

WO-00/57604 A1 describes a method and apparatus for setting up parallel calls. This document describes a mobile communication system in which a number of calls are handled for one user. The calls may have different bearer capabilities. In case a further call with its bearer capability requests a set-up, either another parallel call can be set-up, or a call can be put on hold or can be disconnected or can be put in a waiting state. The bearer capabilities of the number of calls are checked, in order to determine whether any of the calls have the same bearer capabilities. It is also checked whether any of the calls fulfill bearer requirements and can be taken on hold.

US 2004/0215766 A1 relates to methods and systems for providing wireless computer communication. It is described that mobile computers can communicate with a GPRS network via a first server, or with a hot spot network via a different server. The focus of the document is on managing the handover between two such networks. It is mentioned that the computing device and the one or more networks can have one or more channels for communicating, where each channel will generally be assigned to a specified IP port of the computing device. A processing unit is arranged to provide a wireless network, which unit comprises a receiving means arranged to receive data specifying the bandwidth requirements for a network connection between the network and a computing device that wishes to join the network, a processing means arranged to process data received from the receiving means and, if bandwidth is available, to cause an allocation means to allocate a bandwidth to at least one of the connections. The unit that provides a wireless network is a server that generates the network. As a consequence, the receiving requests for joining the network and then allocating bandwidth to connections in response is done within the context of a single network being generated by the entity receiving and processing such requests.

EP 1 320 103 A1 describes a method for connecting a terminal over a mobile radio access network or a local access network to the core network of a communication system. A core network controls the communications to and from a terminal whatever the used access network. An appropriate access network is selected according to network profiles stored in the core network. In an example, user equipment UE can communicate with a core network via a UTRAN or a different access network. It is described that an MSC or a SGSN can manage several simultaneous calls to or from the terminal over different access networks. Thus, even in the case of macrodiversity, the call is controlled by the same entity, e.g. MSC or SGSN.

OBJECT OF THE INVENTION

The object of the present invention is to improve upon such systems that allow a plurality of communication paths between a network and a terminal, and especially to provide more flexibility.

SUMMARY OF THE INVENTION

This object is solved by the communication path allocating entity and communication path allocating method as described in the independent claims of the present application. Advantageous embodiments are described in the dependent claims.

In accordance with the invention, a receiver is provided for receiving session requests, where the Session requests request one or both of an establishment of a new communication session and a change in an existing communication session between the network and the terminals. Furthermore, a processor is provided for processing the session requests and for independently allocating N downlink communication paths from the network to the terminals and M uplink communication paths from the terminals to the network for each session, where $N \geq 0$, $M \geq 0$ and $M+N \geq 1$. The processor is furthermore arranged for keeping a record of allocated communication paths and their associated sessions in a session database, and using information from the session data base for the allocating.

It is noted that a session can relate to one terminal (e.g. in a point-to-point or unicast communication) or to several terminals (e.g. in a point-to-multipoint or a broadcast communication).

By providing a dedicated communication path allocating entity, the present invention achieves the goal of increased flexibility. Namely, by being able to receive and process session requests, the communication path allocating entity can flexibly adapt to the wishes and desires of the senders of said session requests, such as the communication end points. Thereby, it is possible for e.g. a terminal to provide preference information in the session request, and the communication path allocating entity can then take this preference information into account for the allocation operation.

Furthermore, in accordance with the present invention, a session database is maintained, which is preferably modified every time that the status of a session changes. With the help of the session database, the communication path allocating entity is informed of all sessions and their status, and uses information from the session database when allocating new communication paths or reallocating existing communications paths.

In summary, the present invention provides a new type of network entity, which provides the functionality of flexibly allocating and re-allocating communication paths to communication sessions, whereby it is possible to take into account various types of decision information for making an allocating decision, such as e.g. preference information (of a terminal user or a network operator), terminal capability information, resource availability information, or network load information.

These and other advantages of the present invention will become more apparent from the description of detailed embodiments in the following.

DETAILED DESCRIPTION OF EMBODIMENTS

Figure 1:
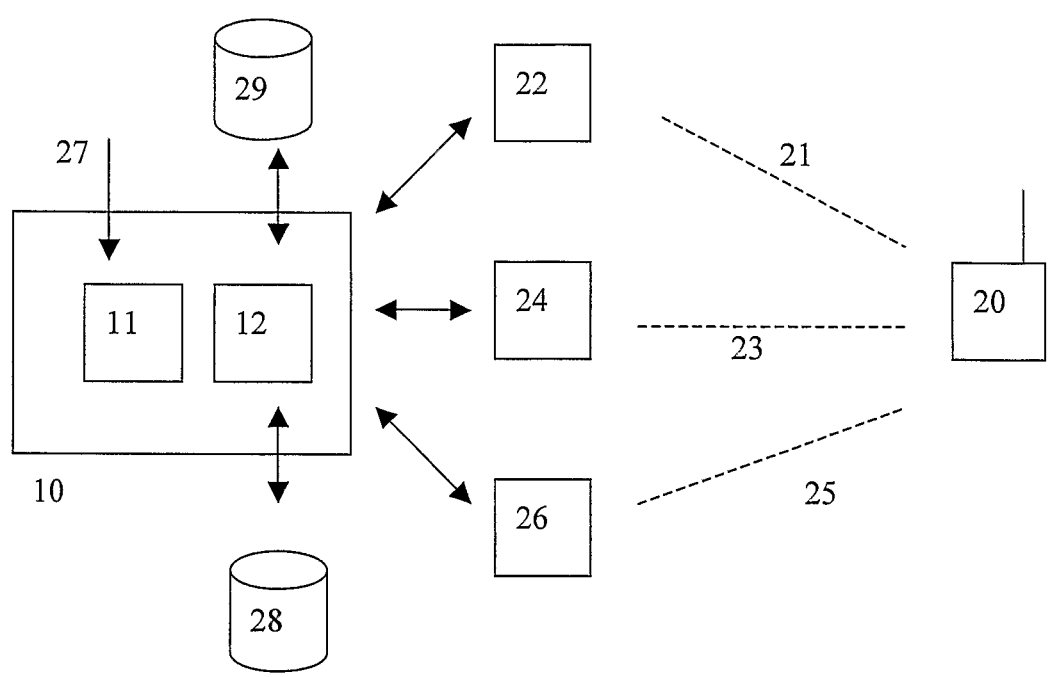
FIG. 1 is a schematic block diagram of an embodiment of the invention.

FIG. 1 shows a schematic block diagram of a basic embodiment of the present invention. Reference numeral 10 relates to a communication path allocating entity, which comprises a receiver 11 for receiving session requests 27. Furthermore, a processor 12 is provided for processing the session requests 27. The example of FIG. 1 shows three communication paths 21, 23 and 25, which connect respective path control elements 22, 24 and 26 with a terminal 20. Terminal 20 is indicated as being a wireless terminal, which is a preferred application of the present invention, but terminal 20 could also be a wire bound terminal.

FIG. 1 is only a schematic example, and in a real network there will be a plurality of terminals 20, each being able to communicate with the network via at least one communication path.

FIG. 1 furthermore shows a session database 28, in which the processor 12 keeps a record of allocated communication paths and their associated sessions. Preferably, the processor 12 modifies or updates the session database 28 each time that the status of a session changes, either in that a new session is introduced, which uses new communication paths and/or re-uses existing communication paths, and/or in that an existing session is changed by adding, removing or modifying communication paths, and/or in that communication paths are de-allocated or obsolete sessions are deleted.

FIG. 1 furthermore shows a network database 29, in which network related information is maintained such as allocating preferences set by the network operator, network load information on the momentary or expected load of the network, and network infrastructure information on the arrangement and capabilities of network nodes.

Figure 2:
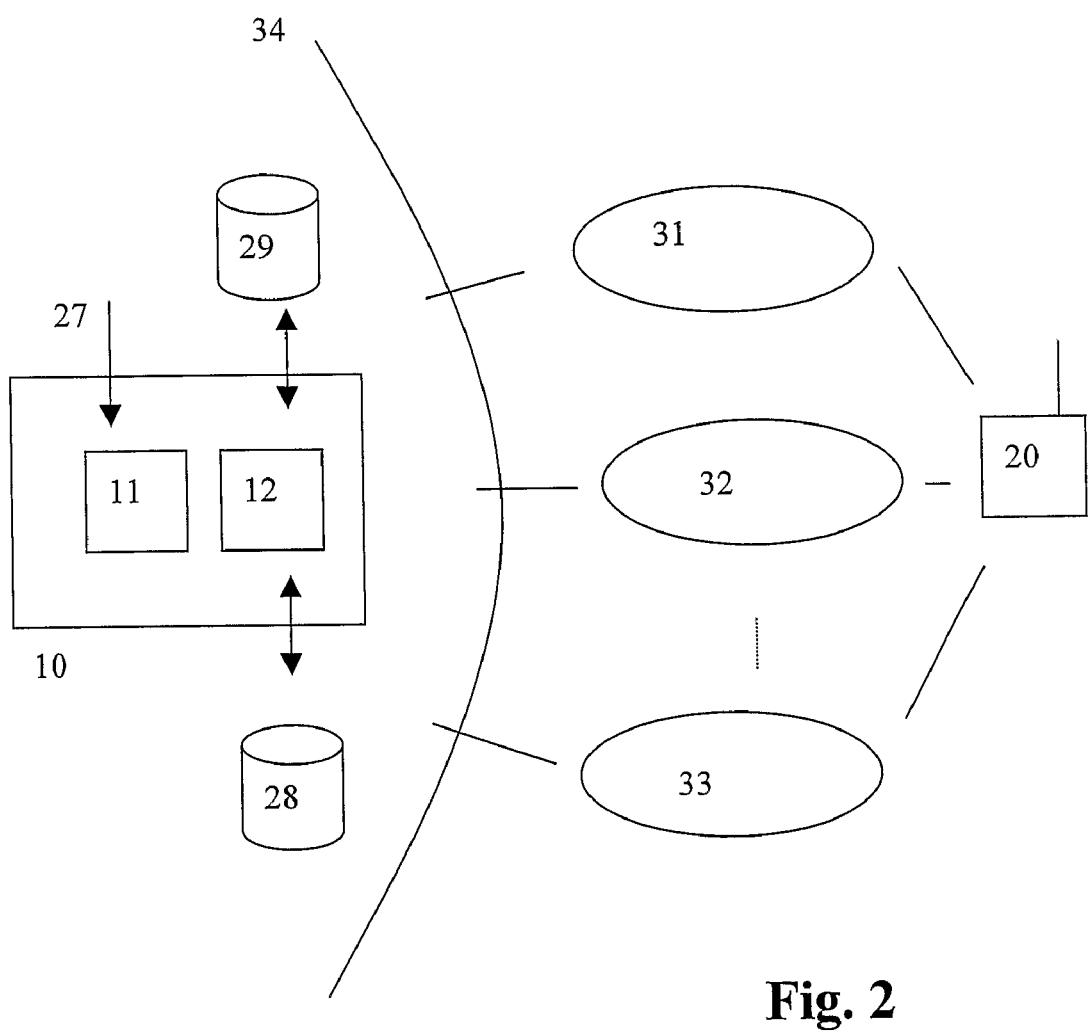
FIG. 2 is a schematic block diagram of the invention in the context of a communication system that comprises a plurality of sub-networks.

The communication paths 21, 23 and 25 can be provided in any suitable or desired way. For example, they can be provided over at least two different sub-networks 31, 32 and 33 as shown in FIG. 2. The processor is preferably arranged to be able to independently allocate communication paths in such sub-networks 31, 32 and 33. For example, the sub-networks 31-33 can be circuit-switched wireless access networks and/or packet-switched wireless access networks.

It is noted that the communication path allocating entity 10 is preferably provided in a core network part 34 provided behind such access or connection networks 31, 32 and 33. A preferred example of the core network part 34 is an Internet Protocol Multimedia Subsystem (IMS). In a conventional network the IMS does not have any direct connection to any terminals 20 and must rely on communication/bearer services of the access networks, without the possibility of selecting or re-arranging specific communication paths (which can also be referred to as communication legs) among the individual access networks. Especially, a conventional system cannot make specific allocating decisions based on information such as preference information, terminal capability information, resource available information, or network load information. In contrast thereto, the present invention provides the communication path allocating entity 10, which can flexibly allocate, re-allocate or de-allocate individual communication paths or legs among the sub-networks 31-33 to each individual communication session.

For example, the communication path 21 could be a circuit-switched path over a GSM network. Communication path 23 could be a packet-switched path over a UMTS network. Communication path 25 could be a packet-switched path over a WLAN. Then, in accordance with an example of the present invention, the communication path allocating entity 10 could allocate the communication paths 21, 23 and 25 in dependence on predetermined decision information provided within a session request and/or provided from other sources (such as the network database 29), in order to allocate the communication paths flexibly. For example, it is possible that there is a network preference that voice calls be sent over the circuit-switched communication path 21. However, if the communication path 21 is already used by another session, and the entity 10 receives a session request 27 for another voice call to terminal 20, then the entity 10 can be arranged to decide to use one or both of the other communication paths 23 and 25 for placing the newly desired voice call. After determining that communication path 21 is not available, this may comprise checking whether communication paths 23 or 25 is available and then consequently routing the voice call over one of the paths or rejecting the session request, if none of the other paths is available.

In another example, even if the circuit-switched communication path 21 is available and a new session request for a voice call is received, the entity 10 could be arranged to first determine whether one of the packet-switched communication paths 23 or 25 is in active use (this determination is preferably done by checking the session database 28), and to then place the requested voice call as packet-switched by sharing of one of the existing communication paths 23 or 25.

In each case, if any changes in the sessions are performed the database 28 is updated accordingly.

In order to set-up or remove communication paths from a given session, the communication path allocating entity 10 appropriately communicates with the communication path control elements 22, 24 or 26. Such communication path control elements can e.g. be a Mobile Switching Center (MSC) a Serving GPRS Service Node (SGSN), a Call/Session Control Function (CSCF) or a similar control node.

It is to be noted that the communication paths 21, 23 and 25 shown in FIG. 1 are not always available, e.g. due to the mobility of the terminal 20, due to traffic conditions in the network, etc. It is specifically in view of this that the present invention is advantageous, as it can flexibly allocate communication paths depending on their availability and the indicated preferences. By virtue of this flexibility, the rejecting of session requests can be avoided.

It should be noted that the above example of a voice call is indeed only an example and by no means limiting. A session within the meaning of the present specification and claims relates to a communication of any kind, e.g. also to data calls and other types of communication services, and can relate to a communication to one terminal (e.g. a point-to-point communication) or to several terminals (e.g. point-to-multipoint or broadcasting communication).

Furthermore, in the examples of FIGS. 1 and 2, the entity 10 is shown as a physical unit, such as a network node or server. However, it should be noted that an entity within the meaning of the present specification and claims is any arrangement suitable for providing the described functions and can be a physical unit, such as a network node or a server in the network, or can be a distributed architecture of a plurality of physical units which together provide the described functionalities. In the physical unit or in the distributed architecture, the communication path allocating entity can be embodied as software, hardware or any suitable combination of software and hardware.

According to a preferred embodiment, the processor 12 of the communication path allocating entity 10 is arranged in such a way that it can independently allocate N downlink communication paths from the network to a terminal and M uplink communication paths from a terminal to the network for each session, where $N \geq 0$, $M \geq 0$ and $M+N \geq 1$. Furthermore, it is possible to request different characteristics in the upstream and downstream direction, e.g. different bit rates, latency, etc. This again underscores the flexibility of the concept of the present invention.

The communication path allocating entity of the invention is preferably able to base its allocating decision on information that comprises one or more of preference information, terminal capability information, resource availability information and network load information. Preferably, at least a part of the information is extracted from the session requests, especially preference information and possibly terminal capability information. The latter can be the case if the session is originated by the terminal 20, as the session request will then also be sent by the terminal 20, and the terminal 20 can add its own capabilities and/or preferences to the session request. An example of preference information is an indication that certain types of calls (e.g. video calls) should be sent via a specific type of communication path, e.g. via a WLAN connection. An example of terminal capability information is an indication that the terminal is not able to process a certain type of call, e.g. as no video processing capabilities.

However, it is equally possible to add certain types of information to a session terminated by the terminal 20, especially preference information, such as to provide a certain amount of bandwidth to the communication.

Beyond user preference information given by a user of one of the terminals 20, it is also possible that the preference information is network operator preference information set by an operator of the networks. Such network operator preference information is preferably maintained in network database 29.

An example of resource availability information is an indication of whether one or more of the communication paths 21, 23 and 25 is available for a session. The availability information can indicate that it is not available, e.g. due to being used by another session or not available to any sessions, e.g. because the mobile terminal 20 is outside of the coverage area. According to a preferred embodiment, the processor 12 is arranged for determining at least a part of the resource availability information from the session database 28. In other words, it is preferred that the communication path allocating entity 10 can determine whether a particular communication path is available or not by checking the session database 28.

An example of network load information is an indication to what extent the network or certain parts of the network are in use. The communication path allocating entity of the present invention can then preferably be used to provide load equalisation by allocating communication paths in such a way that the load is evenly distributed. According to a preferred example, the network load information may comprise sub-network load information respectively associated with sub-networks 31, 32 and 33 as shown in FIG. 2. The processor 12 is then preferably arranged such that when deciding on whether to allocate a communication path in a particular sub-network, the sub-network load information of the particular sub-network is taken into account. For example, if sub-network 31 is a circuit-switched network, such as a GSM network, and it has a high traffic load (e.g. is utilized to more than 90%), while the network load on packet-switched sub-network 32 (e.g. a WLAN) is lower, then the communication path allocating entity 10 can decide to preferably allocate a communication path in sub-network 32.

Figure 3:
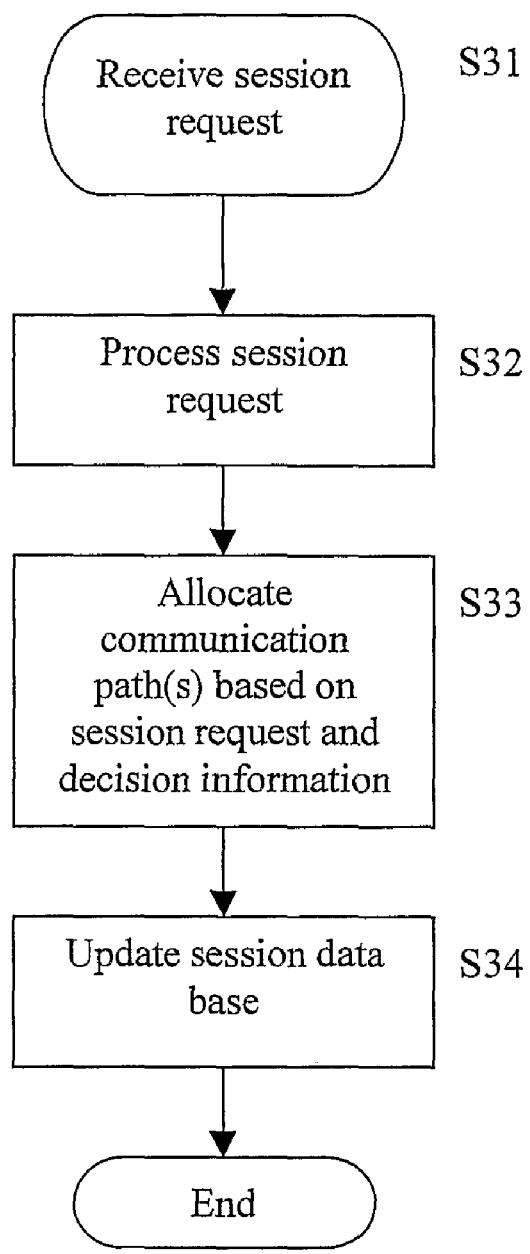
FIG. 3 is a flowchart showing a method embodiment of the present invention.

FIG. 3 shows a flowchart of a basic method embodiment of the present invention. After having received a session request in step S31, the session request is processed in step S32, and an allocation of one or more communication paths based on the session request and on one or more types of decision information is performed in step S33. Examples of the decision information were given above. Finally, in step S34 the session database 28 is appropriately updated in order to indicate the addition or removal of sessions, and/or to indicate the changes in one or more communication paths associated with a given session.

Now some more detailed examples will be described. As already indicated above, a session request for establishing a communication can basically have two origins, namely from a terminal 20 for a terminal originated session, and from another communication partner in a session terminated by the terminal 20. However, it is also possible to receive session requests that relate to the modification of an ongoing session, e.g. to add or remove a specific communication path from an ongoing session. Such session requests that relate to changing ongoing sessions could, besides from the communication partners involved, also be issued by other sources, e.g. within the network itself. Finally, it is also possible to receive session requests for ending a session. Such requests could again come from the communication partners involved in that session, or from other sources, such as within the network.

In accordance with the different types of session requests, the communication path allocating entity of the invention is preferably arranged such that it can set-up new communication paths based on the session requests and/or re-allocate existing communication paths based on the session requests, and/or de-allocate existing communication paths based on the session requests.

The session requests themselves may be arranged in any suitable or desirable way, and can e.g. make use of suitable protocols such as the DTAP (Direct Transfer Application Part) protocol, the ISUP (ISDN User Part) protocol, or the Session Initiation Protocol (SIP). The session request may contain a variety of types of information, such as the calling party (originator), called party (destination) or—in the case of multicast or broadcast—a list of called parties/destinations or a group identifier. A session request may furthermore comprise a session description that includes session specific parameters. These session specific parameters can comprise decision information of the above-mentioned kind, e.g. preference information, terminal capability information, etc. For example, the session requests can include a request for different characteristics (e.g. bit rates, latency, etc) for individual upstream and downstream communication paths. It is also possible to request M uplink communication paths and N downlink communication paths, where $M \geq 0$, $N \geq 0$ and $M+N \geq 1$.

Furthermore, the session requests may contain information identifying a particular ongoing session, together with an indication to modify that session in a predetermined way, e.g. to add or to remove a predetermined communication path. The session requests can also contain preference information from one of the communication partners involved in the session, or from the network operator, e.g.

the use of particular types of communication paths, the use of particular communication parameters, like conversion from SIP calls to circuits-switched calls being allowed or prohibited, and to allow or prohibit certain combinations of uplink communication paths and downlink communication paths for particular subscribers.

The allocating of communication paths to a session means that a mapping is performed. This operation can be based upon information as specified above, which is included in a session request, on the availability of resources associated with the respective communication paths, operator preferences in general (e.g. all calls of type A are preferably routed via communication path of type B) and operator preferences which are specific for one of the communication partners (e.g. premium subscriber, normal subscriber, etc.), and the status of ongoing sessions in general and also the status of ongoing sessions involving the terminal for which the session request in question is being sent. For example, if the called party already has some established sessions, it might be either impossible to add another session to the same communication path, e.g. if a circuit-switched call is to be established and the called party already has a circuit-switched call ongoing, then the called party is of course busy, or on the other hand the same communication path is to be used (e.g. use of a GPRS communication path for all sessions, instead of a WLAN communication path, or vice versa). In order to perform the decision in this way, the communication path allocating entity accesses the session database 28 for respective details.

As a result of the processing and allocation decision procedure, a number of outcomes are possible:

the entire request, or a part of the request is rejected (e.g. not enough resources, not possible to allocate the desired communication paths, etc), a communication path establishment is requested from a respective communication path control element 22, 24 or 26 in the uplink and/or downlink direction, and for each successfully established session, the session database 28 is appropriately updated.

Once the communication path allocating entity has completed the allocating or mapping of sessions and communication paths, other system entities are responsible for performing actions that relate to terminal mobility such as handovers etc. However, for the event that a communication path is interrupted, the communication path allocating entity and corresponding method are preferably arranged such that there are mechanisms for:

re-establishing a communication path via the associated communication path control element, such that no change in the session database 28 is necessary. Optionally it could be monitored how often a communication path has to be re-established, in order to possibly later avoid certain such paths due to instability;

re-establishing a communication path via another communication path control element, i.e. allocating a new communication path to the session, and then updating the session database accordingly, i.e. de-allocating the interrupted communication path and allocating the new communication path in the record;

maintaining the session with the remaining communication paths, i.e. only updating the session database by indicating in the record that the interrupted communication path has been de-allocated, and/or shutting down the entire session, i.e. signalling to all communication path control elements involved, and possibly also to the terminal, and updating the database by indicating that the session is over, or e.g. removing the session all together from the session database.

As an option, it can be arranged that the session database 28 is periodically checked for consistency, to avoid that obsolete entries remain therein. In order to avoid that an entry becomes obsolete in the session database, it is possible to monitor a predetermined time period per session entry with respect to changes in the entry, e.g. a time-out period that is reset every time that a change occurs. If the predetermined time period expires, then it is known that for that particular entry no update or request has been made within the time period. The session database can then e.g. mark the entry as probably obsolete and delete it after a second predetermined time period, which might also be zero, if no further update or request for that entry appears, or the communication path allocating element 10 can check the entire database 28 for consistency among communication paths and sessions.

An example of the above-described features will now be described with respect to FIGS. 4 and 5.

Figure 4:
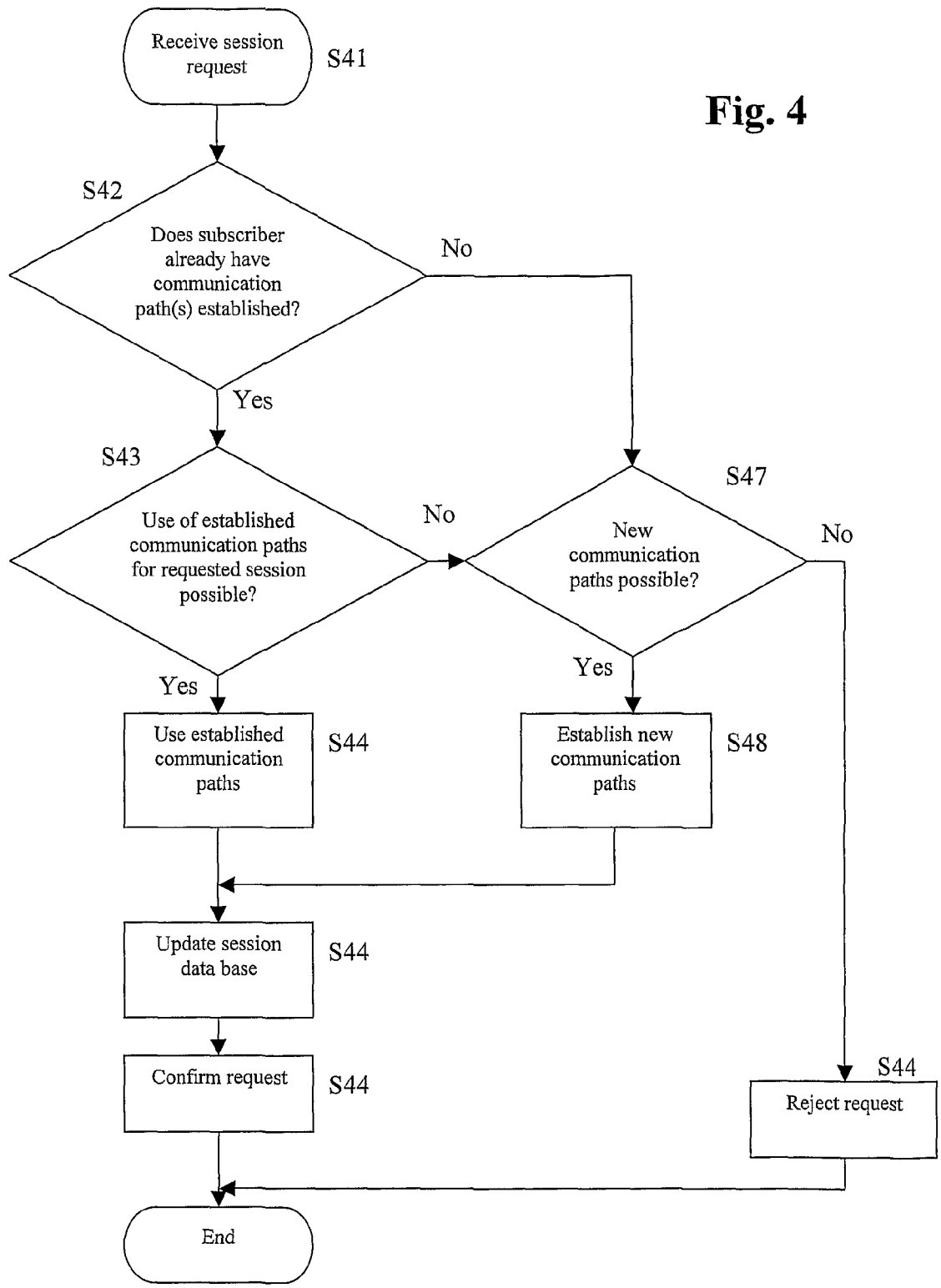
FIG. 4 is a flowchart showing a further method embodiment of the present invention.

In FIG. 4, after having received a session request in step S41, the procedure S42 determines whether the subscriber associated with the terminal identified in the session request already has communication paths established. This is done by accessing the session database 28. If not, the procedure branches to step S47, in which it is determined whether new communication paths can be established. However, if the subscriber has sessions in the session database, it is checked whether the established communication paths can be used for the requested session. Use of established communication paths can mean the sharing of a path by two sessions or it can mean re-allocating a communication path from one session to another. If no use is possible or desirable, the procedure again branches to step S47.

If established communication paths can be used, then these are modified if this is necessary (step S44), and afterwards the session database is updated (S45) and the request is confirmed (S46).

On the other hand, if the outcome of step S42 or step S43 was negative, then the procedure in step S47 determines whether it is possible to establish new communication paths. If not, then the request is rejected in step S49. Otherwise, the new communication paths are established in S48, and then the session database is again updated (S45) and the request confirmed (S46).

Figure 5:
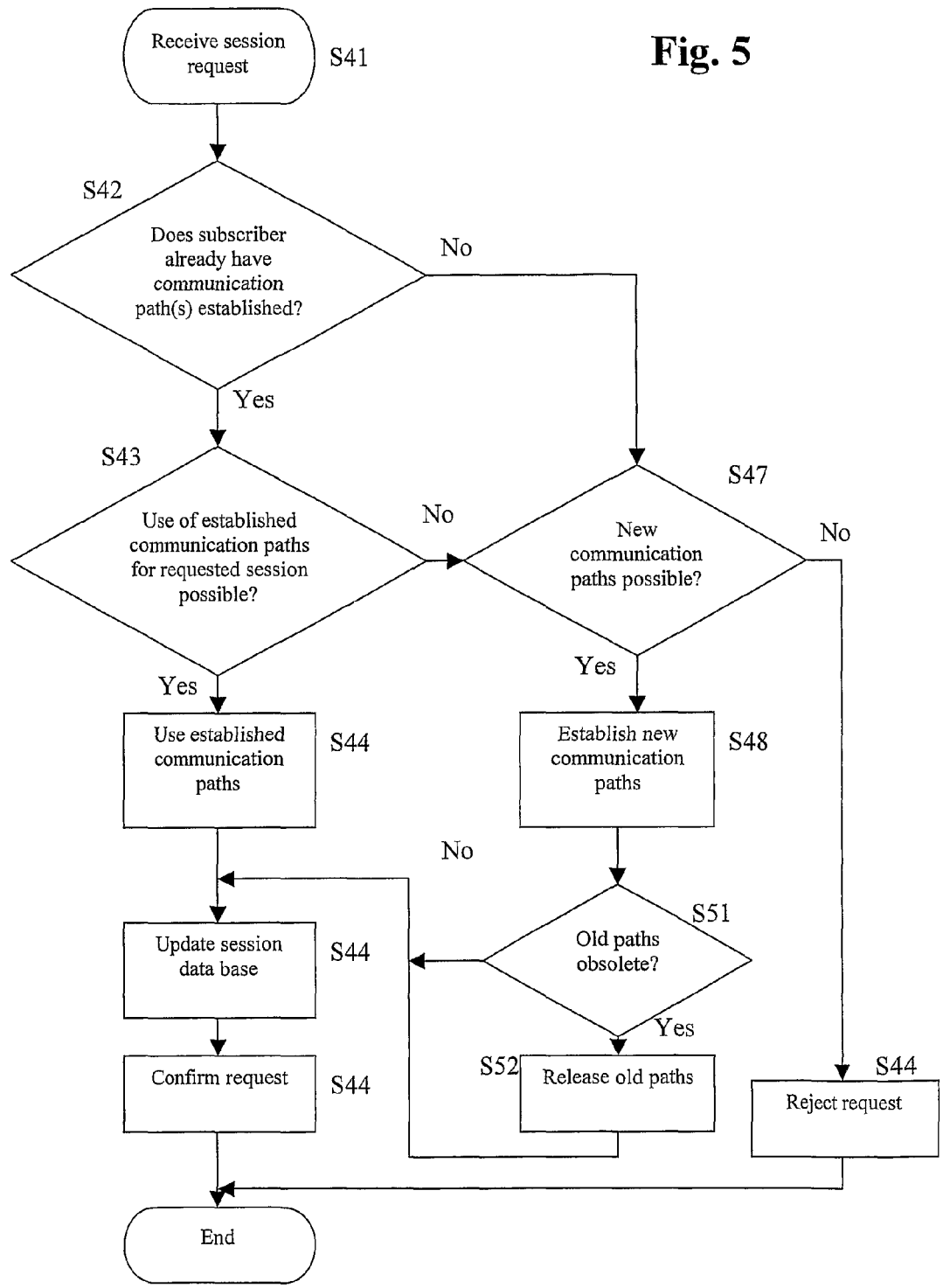
FIG. 5 is a flowchart showing yet another method embodiment of the present invention.

FIG. 5 shows a variation of the method of FIG. 4 and equivalent elements carry the same reference numerals, such that a repeated description is not necessary. In the method of FIG. 5, after having established new communication paths in step S48, it is checked whether due to the newly established communication paths, some old paths have become obsolete. If not, then the procedure passes to step S45, but if yes, then the procedure releases the old communication paths in step S52. Then the session database is again appropriately updated in step S45 where in this case the session entries are appropriately amended to take into account that the old communication paths have been released.

In the examples of the present invention, characteristics of the existing and new sessions play an important role together with the allowed (for the subscriber) and possible (technically and/or physically possible) combinations of communication paths, which may depend on terminal capabilities, the availability of communication paths and resource utilization.

The method of the present invention can be embodied in any of the above-described ways, and especially can be embodied in the form of a computer program product arranged to execute the respectively described method steps when executed on a communication path allocating entity (e.g. a network node or network server) in a communication network.

Although the present invention has been described with reference to specific detailed embodiments, these only serve to make the invention easier to understand, and are not intended to be limiting. The scope of protection is defined by the appended claims. Reference signs in the claims serve to make the claims to read, but have no limiting effect.

The invention claimed is:

1. A dedicated communication path allocating entity for allocating communication paths in communication sessions between a network and a plurality of terminals, each of said terminals being connectable to said network via at least one of said communication paths, said dedicated communication path allocating entity comprising:
   a receiver for receiving session requests for requesting one or both of an establishment of a new communication session and a change in an existing communication session between said network and said terminals,
   a processor for processing said session requests and for independently allocating N downlink communication paths from said network to at least one of said terminals and M uplink communication paths from said at least one of said terminals to said network for each session, where N≧0, M≧0 and M+N≧1, where said processor comprises logic for
   keeping a record of allocated communication paths and their associated sessions in a session data base, and
   using information from said session data base for the allocating; and
   where said session requests are not related to handovers based on terminal mobility, wherein once the processor has processed said session requests and completed allocating the communication paths then other system entities are responsible for performing actions that relate to terminal mobility such as handovers; and
   said processor allocating said one or more communication paths based on information that comprises:
      preference information,
      terminal capability information,
      resource availability information, and
      network load information.

2. The dedicated communication path allocating entity according to claim 1, wherein said communication paths are provided over at least two different sub-networks arranged for accessing said terminals, said processor independently allocating communication paths in said sub-networks for a communication session.

3. The dedicated communication path allocating entity according to claim 2, wherein said terminals are wireless terminals and said sub-networks comprise a circuit switched wireless access network and a packet switched wireless access network.

4. The dedicated communication path allocating entity according to claim 1, being provided in an Internet Protocol Multimedia Subsystem.

5. The dedicated communication path allocating entity according to claim 1, said processor extracting at least a part of said information from said session requests.

6. The dedicated communication path allocating entity according to claim 1, wherein said preference information comprises one or both of user preference information set by a user of one of said terminals and network operator preference information set by an operator of said network.

7. The dedicated communication path allocating entity according to claim 1, wherein said processor determining at least a part of said resource availability information from said session data base.

8. The dedicated communication path allocating entity according to claim 1, wherein said network load information comprises sub-network load information respectively associated with sub-networks of said network, said processor deciding on whether to allocate a communication path in a particular sub-network, the sub-network load information of said particular sub-network being taken into account.

9. The dedicated communication path allocating entity according to claim 1, wherein said processor comprising logic for one or more of:
   setting up new communication paths based on said session requests,
   re-allocating existing communication paths based on said session requests, and
   de-allocating existing communication paths based on said session requests.

10. A dedicated communication path allocating method for allocating communication paths in communication sessions between a network and a plurality of terminals, each of said plurality of terminals being connectable to said network via at least one of said communication paths, said dedicated communication path allocating method comprising:
   receiving session requests for requesting one or both of an establishment of a new communication session and a change in an existing communication session between said network and said terminals,
   processing said session requests and independently allocating N downlink communication paths from said network to at least one of said terminals and M uplink communication paths from said at least one of said terminals to said network for each session, where N≧0, M≧0 and M+N≧1; and
   keeping a record of allocated communication paths and their associated sessions in a session data base, and using information from said session data base for the allocating; and
   where said session requests are not related to handovers based on terminal mobility, wherein after processing said session requests and completing the allocating of the communication paths then other system entities are responsible for performing actions that relate to terminal mobility such as handovers; and
   said allocating of said one or more communication paths is based on information that comprises:
      preference information,
      terminal capability information,
      resource availability information, and
      network load information.

11. The dedicated communication path allocating method according to claim 10, wherein said communication paths are provided over at least two different sub-networks arranged for accessing said terminals, and said allocating step independently allocates communication paths in said sub-networks for a communication session.

12. The dedicated communication path allocating method according to claim 11, wherein said terminals are wireless terminals and said sub-networks comprise a circuit switched wireless access network and a packet switched wireless access network.

13. The dedicated communication path allocating method according to claim 10, being applied in an Internet Protocol Multimedia Subsystem.

14. The dedicated communication path allocating method according to claim 10, comprising extracting at least a part of said information from said session requests.

15. The dedicated communication path allocating method according to claim 10, wherein said preference information comprises one or both of user preference information set by a user of one of said terminals and network operator preference information set by an operator of said network.

16. The dedicated communication path allocating method according to claim 10, comprising determining at least a part of said resource availability information from said session data base.

17. The dedicated communication path allocating method according to claim 10, wherein said network load information comprises sub-network load information respectively associated with sub-networks of said network, and when deciding on whether to allocate a communication path in a particular sub-network, the sub-network load information of said particular sub-network is taken into account.

18. The dedicated communication path allocating method according to claim 10, further comprising one or more of:
setting up new communication paths based on said session requests,
re-allocating existing communication paths based on said session requests, and
de-allocating existing communication paths based on said session requests.

19. A communication path allocating entity for allocating a communication path for a communication session between a network and a terminal, said communication path allocating entity comprising:
a receiver for receiving a session request for requesting one of an establishment of a new communication session and a change in an existing communication session between said network and said terminal,
a processor for processing said session request and for independently allocating N downlink communication paths from said network to said terminal and M uplink communication paths from said terminal to said network for each session, where $N \geq 0$, $M \geq 0$ and $M+N \geq 1$,
where said processor comprises logic for:
keeping a record of allocated communication paths and their associated communication sessions between the network and a plurality of terminals in a session data base, and
using information from said session data base for the allocating of the N downlink communication paths from said network to said terminal and the M uplink communication paths from said terminal to said network, and
where said session request is not related to handovers based on terminal mobility, wherein once the processor has processed said session request and completed allocating the communication paths then other system entities are responsible for performing actions that relate to terminal mobility such as handovers; and
said processor allocating said one or more communication paths based on information that comprises:
preference information,
terminal capability information,
resource availability information, and
network load information.

20. A communication path allocating method for allocating a communication path for a communication session between a network and a terminal, said communication path allocating method comprising the steps of:
receiving a session request which requests one of an establishment of a new communication session and a change in an existing communication session between said network and said terminal,
processing said session request and independently allocating N downlink communication paths from said network to said terminal and M uplink communication paths from said terminal to said network for each session, where $N \geq 0$, $M \geq 0$ and $M+N \geq 1$,
keeping a record of allocated communication paths and their associated communication sessions between the network and a plurality of terminals in a session data base, and
using information from said session data base for the allocating of the N downlink communication paths from said network to said terminal and the M uplink communication paths from said terminal to said network, and
where said session request is not related to handovers based on terminal mobility, wherein after processing said session request and completing the allocating of the communication paths then other system entities are responsible for performing actions that relate to terminal mobility such as handovers; and
said allocating said communication path is further based on information that comprises:
preference information,
terminal capability information,
resource availability information, and
network load information.

21. A communication path allocating entity for allocating a communication path for a communication session between a network and a terminal, said communication path allocating entity comprising:
a receiver for receiving a session request for requesting one of an establishment of a new communication session and a change in an existing communication session between said network and said terminal,
a processor for processing said session request and for independently allocating N downlink communication paths from said network to said terminal and M uplink communication paths from said terminal to said network for each session, where $N \geq 0$, $M \geq 0$ and $M+N \geq 1$,
where said processor comprises logic for:
keeping a record of allocated communication paths and their associated communication sessions between the network and a plurality of terminals in a session data base, and
using information from said session data base for the allocating of the N downlink communication paths from said network to said terminal and the M uplink communication paths from said terminal to said network, and
where said processor allocating said communication path is further based on information that comprises:
preference information,
terminal capability information,
resource availability information, and
network load information.

22. The communication path allocating entity according to claim 21, where said session request is not related to handovers based on terminal mobility, wherein once the processor has processed said session request and completed allocating the communication paths then other system entities are responsible for performing actions that relate to terminal mobility such as handovers.

23. A communication path allocating method for allocating a communication path for a communication session between a network and a terminal, said communication path allocating method comprising the steps of:
receiving a session request which requests one of an establishment of a new communication session and a change in an existing communication session between said network and said terminal, processing said session request and independently allocating N downlink communication paths from said network to said terminal and M uplink communication paths from said terminal to said network for each session, where $N \geq 0$, $M \geq 0$ and $M+N \geq 1$, keeping a record of allocated communication paths and their associated communication sessions between the network and a plurality of terminals in a session data base, and using information from said session data base for the allocating of the N downlink communication paths from said network to said terminal and the M uplink communication paths from said terminal to said network, and where said allocating said communication path is further based on information that comprises:
    preference information,
    terminal capability information,
    resource availability information, and
    network load information.

24. The communication path allocating method according to claim 23, where said session request is not related to handovers based on terminal mobility, wherein after processing said session request and completing the allocating of the communication paths then other system entities are responsible for performing actions that relate to terminal mobility such as handovers.

\* \* \* \* \*

UNITED STATES PATENT AND TRADEMARK OFFICE
CERTIFICATE OF CORRECTION

PATENT NO. : 8,265,015 B2  
APPLICATION NO. : 11/916789  
DATED : September 11, 2012  
INVENTOR(S) : Keller et al.

Page 1 of 1

It is certified that error appears in the above-identified patent and that said Letters Patent is hereby corrected as shown below:

On Title Page 2, in Item (56), under "FOREIGN PATENT DOCUMENTS", in Column 2, Line 3, delete "WO 00/67604" and insert -- WO 00/57604 --, therefor.

In the Drawings

In Fig. 4, Sheet 4 of 5, delete "  " and insert -- --, therefor.

In Fig. 4, Sheet 4 of 5, delete "  " and insert -- --, therefor.

In Fig. 5, Sheet 5 of 5, delete " 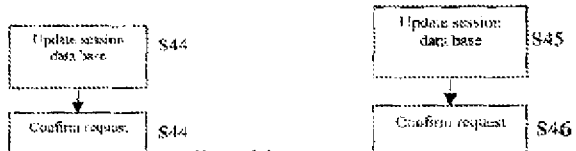 " and insert -- --, therefor.

In Fig. 5, Sheet 5 of 5, delete "  " and insert -- --, therefor.

In the Specification

In Column 2, Line 21, delete "Session" and insert -- session --, therefor.

In Column 4, Line 46, delete "(MSC)" and insert -- (MSC), --, therefor.

Signed and Sealed this  
Fifteenth Day of April, 2014

Michelle K. Lee  
*Deputy Director of the United States Patent and Trademark Office*